United States Patent [19]

Ballor et al.

[11] Patent Number: 4,848,032

[45] Date of Patent: Jul. 18, 1989

[54] ARRANGEMENT FOR MOUNTING AUTOMOTIVE GLASS TO LIFTPLATE

[75] Inventors: John R. Ballor, Mt. Clemens; Elton H. Ireland, Grosse Pointe Woods; Alfred A. Bien, West Bloomfield, all of Mich.

[73] Assignee: Chrysler Motors Corporation, Highland Park, Mich.

[21] Appl. No.: 290,116

[22] Filed: Dec. 27, 1988

[51] Int. Cl.⁴ ............................................. E05F 11/52
[52] U.S. Cl. ........................................ 49/350; 49/375; 49/452
[58] Field of Search ................ 49/227, 350, 375, 452; 52/397, 403, 827

[56] References Cited

U.S. PATENT DOCUMENTS

| | | | |
|---|---|---|---|
| 2,809,827 | 10/1957 | Bogden | 49/227 |
| 3,282,013 | 11/1966 | Boicey | 52/397 X |
| 3,591,982 | 7/1971 | Nantau | 49/227 |
| 4,674,247 | 6/1987 | Hayashi et al. | 52/397 X |

Primary Examiner—Timothy V. Eley
Attorney, Agent, or Firm—Edward P. Barthel

[57] ABSTRACT

An arrangement for mounting a window glass sheet to a liftplate movable within a vehicle door. A plastic spacer bushing, having a through bore formed with an internal left-hand thread, is sandwiched between the glass sheet and the liftplate. A retainer assembly includes a plastic capped retainer, having an external left-hand threaded stem portion, and a metal T-nut. The T-nut head portion is concentrically anchored to the retainer cap portion with the T-nut tubular portion, having a right-hand internally threaded bore, telescopically received within the stem portion bore. The retainer stem portion is inserted through a hole in the glass sheet and is formed with its left-hand external thread engaging the bushing bore internal left-hand thread. The liftplate is secured to the glass sheet by a bolt having a right-hand threaded stem passed through a liftplate aperture for engagement with the T-nut internally threaded tubular portion. Upon initial tightening of the bolt the flex ring is readily deformed for flush tight contact of the spacer rim with both the glass sheet and the liftplate. The counterclockwise tightening of the bushing left-hand thread on the stem portion obviates slippage of the retainer during clockwise torquing of the bolt. Further, the bushing rim portion clamping load is removed from the edge of the glass sheet hole thus obviating glass sheet breakage.

1 Claim, 3 Drawing Sheets

U.S. Patent   Jul. 18, 1989   Sheet 1 of 3   4,848,032
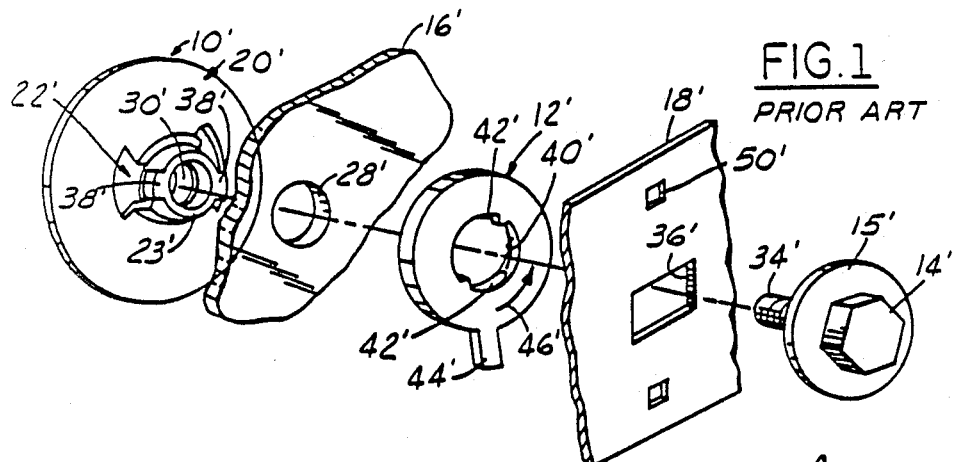
FIG. 1
PRIOR ART
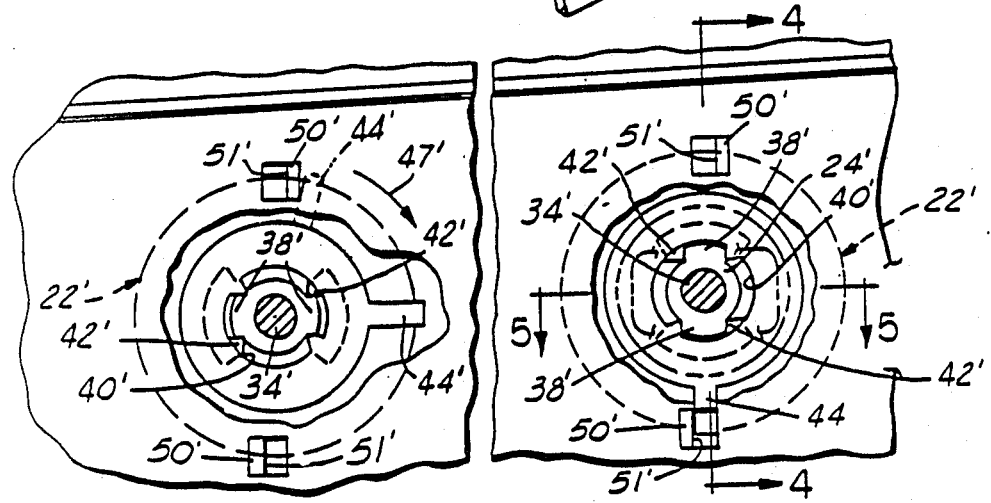
FIG. 2
PRIOR ART
FIG. 3
PRIOR ART
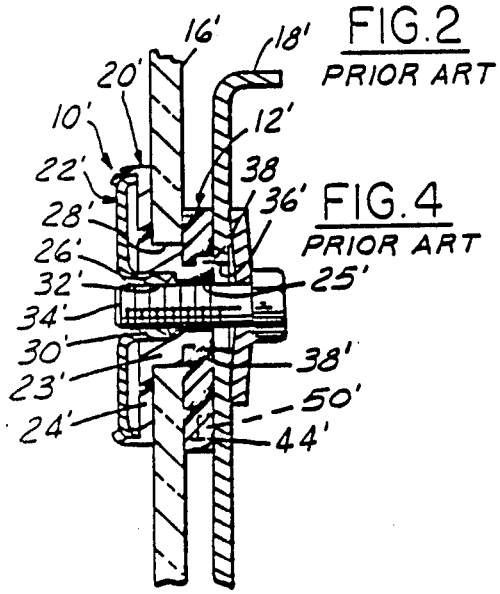
FIG. 4
PRIOR ART
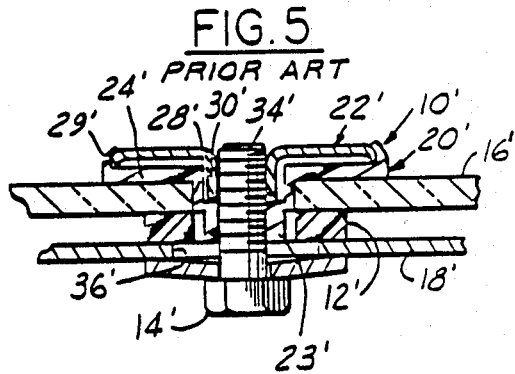
FIG. 5
PRIOR ART

ARRANGEMENT FOR MOUNTING AUTOMOTIVE GLASS TO LIFTPLATE

BACKGROUND OF THE INVENTION

This invention relates to an arrangement for mounting window glass sheet in an automotive door and more particularly to a retainer assembly for attaching the glass sheet to a liftplate movable within the door.

An example of a currently used mounting arrangement for automotive door glass sheet to a liftplate is shown in FIGS. 1-5 and denoted as prior art. The exploded perspective view in FIG. 1 shows a mounting arrangement comprising a T-nut or spanner nut retainer assembly 10', a spacer bushing 12', and a machine bolt 14' with a conical washer 15' for assembling a vehicle door glass sheet 16' to a liftplate 18'. As seen in FIG. 4 the T-nut retainer assembly 10' comprises a plastic capped retainer 20' and a metal T-nut 22' interlocked together. The capped retainer 20' is formed with a hollow stem portion 23' extending axially from a head portion 24' with the stem portion defining an axial bore 25' having a counter-bore 26'. The stem portion 23' is telescopically received in glass sheet circular hole 28'. The T-nut 22' has a hollow tubular portion 30' formed with an internal thread 32' for receiving the threaded shank 34' of the machine blot 14' after its insertion through liftplate aperture 36' and into the hollow stem 23'.

With reference to FIGS. 1 and 2 it will be seen that the stem portion 23' is formed with a pair of radial lugs 38' adapted for insertion in central opening 40' of the spacer bushing 12'. As seen in FIGS. 1-3 the spacer bushing opening 40' is formed with a pair of opposed cam ramps 42' while a radially extending lever arm 44' is provided on the bushing periphery. Thus upon the insertion of the stem 23' through the glass sheet hole 28' and its assembly within the spacer bushing opening 40' one-quarter counter clockwise turn of the lever arm 44' in the direction of arrow 46' (FIG. 1) locks the bushing 12' on the stem 23' and anchors the retainer in the glass sheet hole 28'. The glass sheet 28' is then fastened to the liftplate 18' by means of the machine bolt 14' being inserted through the liftplate aperture 36' the stem bore 25' and threaded into the T-nut stem internal threads 30'. One disadvantage of such a prior art fastener assembly is its lack of axial adjustment means between the spacer 12' and the retainer head portion 24' to compensate for dimensional variances in glass thickness or in the fastener components. This may result in a loose fit between the fastener assembly and the glass sheet causing the bushing 12' and retainer assembly 10' to slip and rotate as the bolt 14' is threaded into the T-nut.

The prior art solution to the above described slippage problem requires a pair of anti-rotation tabs 50' being lanced-out from the inner surface of the liftplate 18'. The tabs 50' provide stop edges 51' operative such that one of the edges is contacted by the bushing lever arm 44', as seen in FIG. 3. Thus, the lever arm 44', as positioned in dashed lines in FIG. 2, is adapted to be rotated in a clockwise direction (arrow 47') when the bolt 14' is turned in a threaded-on direction. It will be seen in FIGS. 2 and 3 that the lever arm 44' is adapted to be rotated a maximum of a few degrees than 180 degrees before it contacts lower stop edge 51' in FIG. 4 preventing further turning or slippage of the retainer assembly 10' and bushing 12' as the bolt 14' is being tightened.

It will be appreciated that the bushing surface must be flush with the opposed liftplate surface to allow one of the stop edges 51' to contact the lever arm 44'. Thus, if the bushing lever arm 44' overlies a tab 50' when positioning the glass sheet 16' the lever arm 44' will fail to contact the stop edge 51'. Further, such miss positioning of the lever arm 44' may cause a stress fracture of the glass sheet upon tightening of the bolt 14'.

The U.S. Pat. No. 3,282,013 issued Nov. 1, 1966 to J. H. Boicey discloses a mounting for glass including a clamping plate, which, in combination with a support plate, is adapted to mount a glass sheet therebetween in such a manner as to more uniformly distribute the securing pressure. The glass sheet and plates have aligned and longitudinally spaced bolt receiving openings. The clamping plate is provided on the surface facing the glass sheet with inwardly directed ridges adapted for bearing contact width a surface of the glass sheet, adjacent to but spaced from the openings whereby maximum clamping pressure is applied to the glass sheet at points remote from the openings.

SUMMARY OF THE INVENTION

It is, therefore, an object of the present invention to provide an improved automotive door window glass sheet mounting arrangement to a liftplate requiring minimal assembly line installation time together with economy in the manufacture of the mounting arrangement components.

It is another object of the present invention to provide a mounting arrangement as set forth above wherein the a spacer bushing between the liftplate and the glass sheet has an internal left-hand thread engaging an external left-hand thread on a hollow stem portion of a T-nut retainer assembly avoiding a loose fit between the fastener assembly and the glass sheet and obviating spinning of the assembly when a securing screw is threaded into the T-nut.

It is another object of the present invention to provide a mounting arrangement as set forth above wherein stress fractures of the glass sheet during installation is minimized by virtue of a plastic spacer bushing intermediate the glass sheet and the liftplate molded with a peripheral rim portion integrally joined to an inner central portion by a relatively thin resilient flex ring portion. Deflection of the flex ring under an initial clamp load biases the rim portion into flush contact with both the glass sheet and liftplate inner surfaces whereby the clamping loads are uniformly applied to the glass sheet at points remote from the glass sheet openings.

The automotive window mounting arrangement of the present invention includes three components, namely a retainer assembly, a spacer bushing, and a machine bolt or screw. The retainer stem portion is passed through the glass sheet hole from the outboard surface of the glass sheet and the bushing internally threaded bore engaged with external threads on the stem portion. The threaded screw shank is inserted from the inboard face of the liftplate through a liftplate aperture and engages the retainer assembly spanner nut internally threaded tubular portion thereby sandwiching the bushing between the outboard face of the liftplate and the inboard surface of the sheet glass.

The retainer assembly comprises a metallic T-nut insert formed with a hollow tubular portion having an internal thread providing a right-hand thread, i.e. when viewed axially it winds in a clockwise and receding direction. An anchoring disc-shaped flange portion extends radially from one end of the tubular portion. The T-nut is partially encased within plastic capped retainer molded with a central hollow stem portion defining first and second extremities. A planar head portion extends radially from the stem portion first extremity with its periphery having hem that initially is axially directed. The T-nut tubular portion extends into a counterbore in the capped retainer hollow shank portion with the spanner nut anchoring flange overlying the retainer cap portion. The head portion hem is rolled over on the spanner nut cap so as to lock the members in assembled relation.

The capped retainer stem portion is formed with an external left-hand thread, i.e. when viewed axially it winds in a counter-clockwise and receding direction. The spacer bushing has a central portion formed with a bore formed with an internal left-hand thread mating with the shank external left-hand thread. The machine bolt shank extends through an aperture in the liftplate for telescopic reception in the retainer stem bore. The screw shank has a right-hand external thread assembled to the spanner nut tubular portion right-hand internal thread. Upon tightening the blot with a driving tool in a clockwise direction the retainer assembly is rotated in a clockwise direction applying an initial clamp load on the inner surface of the liftplate causing the bushing rim portion to be urged into pressure contact with its juxtaposed liftplate and glass sheet surfaces obviating spinning of the assembly.

The plastic spacer bushing rim portion, molded with a predetermined thickness, is integrally joined to the central portion by a relatively thin interconnecting resilient flex ring. As the bolt is torqued-down the glass sheet and the liftplate are tightened to the spacer bushing sandwiched therebetween. A certain amount of the initial clamp load is required to deflect or spring the bushing such that its rim portion is clamped into flush bearing contact with its opposed surfaces. A resultant decrease in the useful clamp load is compensated for by means of the bushing flex ring. That is, only a small percentage of the initial clamp load is required to resiliently deflect the flex ring and bias the bushing rim portion into flush contact with both the glass plate and the liftplate opposed surfaces.

BRIEF DESCRIPTION OF THE DRAWINGS

Further features and advantages of the invention will become apparent to those skilled in the art upon reference to the following description and accompanying drawings in which:

FIG. 1 is an exploded fragmentary perspective view of a prior art mounting arrangement for attaching widow glass sheet to a liftplate in an automotive door;

FIG. 2 is a fragmentary front elevational view, with parts broken away, of the FIG. 1 mounting arrangement with the retainer assembly 20' in its locked mode prior to the screw being tightened with the lever arm 44' intermediate the opposed stop edges 51';

FIG. 3 is a view similar to FIG. 2 showing the mounting arrangement in its fully tightened mode with the lever arm 44' contacting the lower stop edge 51';

FIG. 4 is a fragmentary vertical sectional view taken on the line 4—4 of FIG. 3;

FIG. 5 is a fragmentary horizontal sectional view taken on the line 5—5 of FIG. 3;

DETAILED DESCRIPTION OF THE INVENTION

Figure 6:
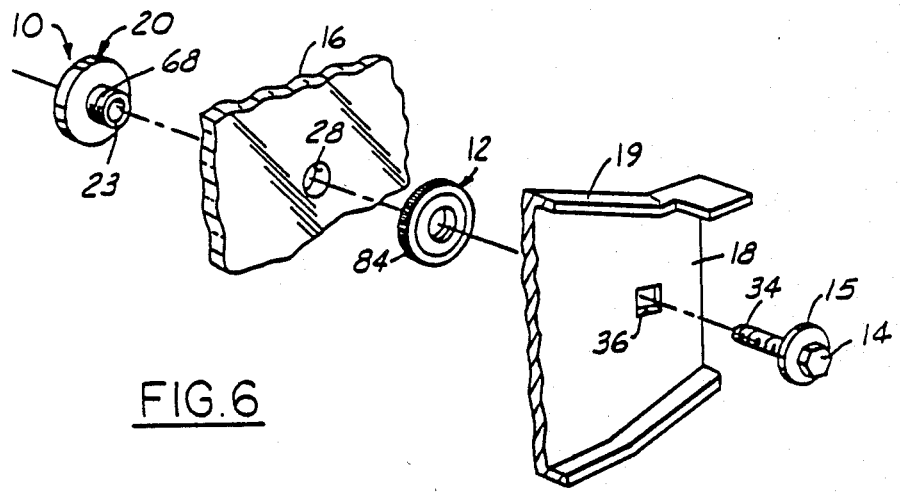
FIG. 6 is an exploded fragmentary perspective view of a mounting arrangement for attaching window glass sheet to a liftplate in an automotive door in accordance with the present invention.

Reference will now be made to FIGS. 6–14 of the drawings wherein a preferred embodiment of the present invention is clearly shown. FIG. 6 shows an exploded perspective of the improved mounting arrangement comprising a T-nut stamping or spanner nut retainer assembly, generally shown at 10, a spacer bushing 12, and a machine bolt 14 having a conical washer 15 thereon. The arrangement is provided to secure a glass sheet 16 to a plate member such as a liftplate 18 of a vehicle door window regulator system. It will be noted that the liftplate 18 is formed with flange portions 19 extending away from the glass sheet 16 providing stiffness to the liftplate 18. Reference may be had to U.S. Pat. No. 3,591,983 issued July 13, 1971 to Hanson for an example of a typical vehicle window installation requiring a mounting arrangement for a glass sheet the disclosure of which is incorporated by reference herein.

Figure 10:
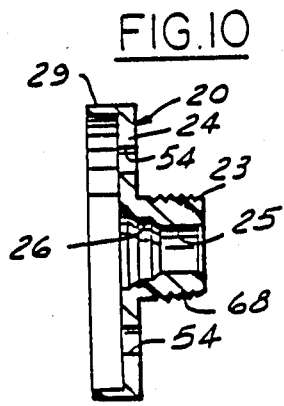
FIG. 10 is a vertical sectional view taken on the line 10—10 of FIG. 9.
Figures 13, 14, 15:
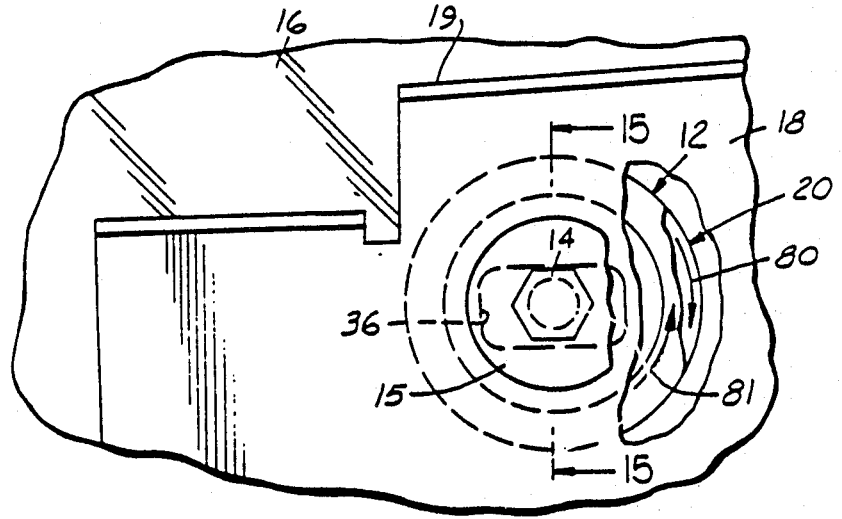
FIG. 13 is a fragmentary front elevational view taken in the direction of arrow "13" in FIG. 14 showing the mounting arrangement of the present invention.
FIG. 14 is a vertical sectional view of the retainer assembly and spacer bushing assembled in a glass sheet hole with the parts not fully threaded together flush with the glass sheet.
FIG. 15 is a vertical sectional view taken on the line 15—15 of FIG. 13.

As best seen in FIG. 14 the T-nut retainer assembly comprises a capped retainer 20 of polymeric or plastic material and a metallic T-nut 22. The capped retainer 20 is formed with a hollow central stem portion 23 extending axially in one direction from a circular cap portion 24. The stem portion 23, defining axial bore 25 and a counterbore 26, is telescopically associated within glass sheet circular aperture or hole 28. FIG. 10 shows the retainer 20 formed with a peripheral hem 29 initially extending axially in the opposite direction from the stem portion 23.

Figure 7:
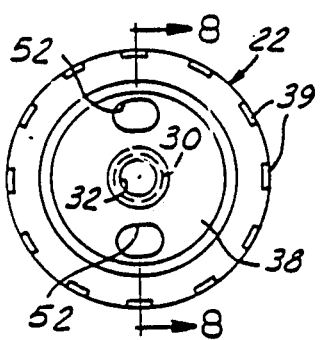
FIG. 7 is a detail front elevational view of the tee-nut member of the present invention.
Figure 9:
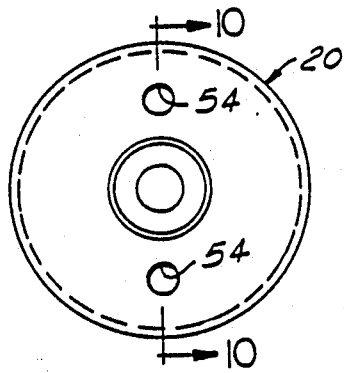
FIG. 9 is a detail front elevational view of the retainer member of the present invention.
Figure 8:
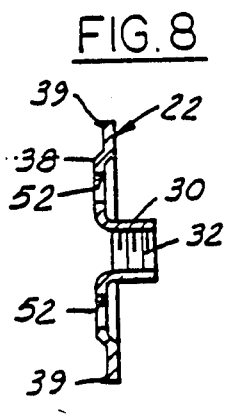
FIG. 8 is a vertical sectional view taken on the line 8—8 of FIG. 7.

With reference to FIGS. 7 and 8 the metal T-nut 22 has a hollow central tubular portion 30 formed with an internal right-hand thread 32 for receiving threaded shank 34 of the machine bolt 14 after its insertion through liftplate aperture 36 and bore 25 of the hollow stem portion 23. The T-nut 22 is formed with a radially extending integral anchoring head portion 38 having a plurality of barbs 39 spaced around its periphery extending axially in the opposite direction as the tubular portion 30. The T-nut tubular portion 30, upon being telescopically received in stem counterbore 26 of the retainer 20, has its head portion 38 captured or partially encased by molding the peripheral hem 29 in a rolled-edge manner so as to engage the barbs 39 as seen in FIG. 14. It will be noted that the T-nut head portion 38 has a pair of opposed elongated openings 52 therein adapted to be engaged by a suitable spanner wrench or tool for applying a torque to the spanner nut retainer assembly 10.

Figure 11:
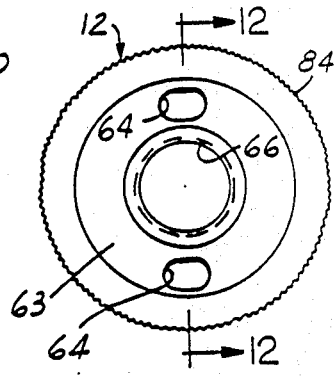
FIG. 11 is a detail front elevational view of the spacer bushing of the present invention.
Figure 12:
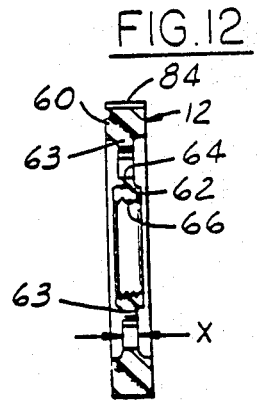
FIG. 12 is a vertical sectional view taken on the line 12—12 of FIG. 11.

The spacer bushing 12 is shown in FIGS. 11 and 12 molded with a peripheral outer rim portion 60 joined to an inner collar portion 62 by a relatively thin interconnecting deflectable resilient flex ring portion 63. In the preferred embodiment the flex ring portion 63, shown in FIG. 12, has a thickness "X" of about 1.5 mm. The central portion 62 is formed with a through bore formed with an internal thread 66 providing a left-hand thread while the retainer stem portion 23 is formed with an external mating left-hand thread 68, i.e. when viewed axially, it winds in a counter-clockwise and receding direction.

It will be noted in FIG. 14 that the bushing central portion 62 has an axial dimension greater than the flex ring portion 63 but less than the rim portion 60. This relationship insures that the spacer bushing rim portion 60 clamp face 61 provides bearing contact with inner surface 76 of the glass sheet 16 at a predetermined radial distance from the hole 28. Thus, the compression load on the glass sheet resulting from the tightening of the bolt 14 is removed from the edge of the hole 28 thereby obviating stress fractures in the glass sheet. In this regard it will be seen in FIGS. 14 and 15 that the T-nut anchoring head portion 38 has an intermediate flexible portion 72 spaced axially outwardly from the retainer cap portion 24. As a result the T-nut 22 provides opposed bearing contact, via the retainer head portion 24, with the glass sheet outer surface 74 (FIG. 15) in an area radially removed from the edge of hole 28 and substantially axially opposed to the spacer bushing rim portion 60.

In operation the assembler locates the T-nut retainer stem portion 23 in the glass sheet opening 28 as seen in FIG. 14. Next, the spacer bushing 12 internal threads 66 are tightened down on the stem portion external thread 68 in a left-hand or counter clockwise rotational direction, as indicated by the arrow 81 in FIG. 13. With reference to FIG. 15, the glass sheet 16 is next fastened to the liftplate 18 by the assembler inserting the bolt threaded shank 34 through the liftplate aperture 36 and the retainer bore 25 for threaded engagement with spanner nut internal thread 32. Upon the assembler tightening the bolt 14 with a driving tool in a clockwise direction, indicated by the arrow 80 in FIG. 13, the spacer bushing internal left-hand thread 66 winds in a counter clockwise direction on with the stem portion external lefthand thread 68 without slippage. Thus, rim portion face 81 is clamped to inner surface 82 of the liftplate and its face 61 to the opposed inner surface 76 of the glass sheet 16 by an initial clamp load. A portion of the initial clamp load acts to flexibly bias the bushing outer ring portion 63 allowing the rim 60 to be drawn into flush pressure contact with the glass sheet inner surface 76 and the liftplate inner surface 82. It will be noted in FIGS. 6, 11, and 12 that the spacer bushing 12 has its outer edge knurled at 84 allowing the assembler to readily torque-down the bushing 12.

It has been found in tests conducted that the disclosed mounting arrangement compensates for dimensional variations in vehicle glass sheets 16. Further, the present mounting arrangement is adapted for use with glass sheets ranging in thicknesses from a minimum of about 3.2 mm to a maximum of about 5.0 mm.

Reasonable modification and variations of the above-described illustrative embodiment of the invention are possible without departing from the spirit and scope of the invention which is defined in the appended claims.

What is claimed is:

1. In a window mounting arrangement for an automotive vehicle, a glass sheet having a circular hole spaced inwardly from a marginal edge thereof, a metallic liftplate having one surface spaced opposite one surface of said glass sheet, a spacer bushing formed of polymeric material located between said liftplate one surface and said glass sheet one surface, an aperture in said liftplate in registry with said glass sheet hole, a retainer assembly positioned on the other surface of said glass sheet, said retainer assembly comprising a plastic capped retainer member and a metal T-nut member, said capped member formed with a hollow stem portion of predetermined outer diameter and axial length, sad stem portion defining first and second extremities, a planar radially extending cap portion extending from said stem portion first extremity, said stem portion telescopically associated within said glass sheet hole such that with said retainer cap portion in flush contact with the other surface of said glass sheet said stem portion is radially spaced slightly inwardly from said glass sheet hole and its second extremity is spaced a slight axial distance from said liftplate inner surface, said T-nut member formed with a hollow tubular portion of predetermined outer diameter and axial length defining first and second extremities, said tubular portion having a right-hand internal thread providing clockwise tightening rotation, a generally planar radially extending anchoring head portion extending from said tubular portion first extremity, said head portion having an intermediate flexible portion spaced axially from said retainer cap portion, said plastic retainer cap portion having a peripheral reverse bend hem engaging the periphery of said T-nut head portion such that said capped retainer and T-nut members are locked against relative movement, the improvement wherein:

said retainer hollow stem portion formed with an external left-hand thread, said spacer bushing including a central portion and an outer rim portion interconnected by an intermediate relatively thin flex ring of predetermined thickness, and wherein said central portion having a predetermined thickness less than said rim portion and greater than said flexing, said central portion formed with a through bore having an internal left-hand thread mating with said stem external left-hand thread, whereby upon initial tightening of said spacer bushing on said retainer stem portion said spacer bushing outer rim portion is positioned in flush abutment with said glass sheet one surface;

a bolt having a shank extending through said liftplate aperture and telescopically associated within said stem bore, said shank formed with a right hand thread threadably engaging said T-nut tubular portion internal thread, whereby upon tightening of said bolt in a clockwise rotational direction said spacer bushing outer rim portion is further tightened in a counter-clockwise rotational direction against its associated glass sheet one surface and liftplate one surface allowing said retainer assembly to apply a predetermined clamp load wherein said spacer bushing flex ring is deflected causing said rim portion to be clamped into flush bearing contact with said glass sheet one surface and said lift plate one surface in a non-slipping manner;
and whereby upon said bolt being further tightened said glass sheet one surface being clamped into bearing contact with said spacer bushing rim portion in an area removed from the edge of said glass sheet hole whereby the clamp load on said glass sheet is removed from the edge of said glass sheet hole thereby obviating glass sheet breakage.

* * * * *